Nov. 6, 1928.
J. G. CAPSTAFF
1,690,616
FILM TREATING APPARATUS
Original Filed Feb. 3, 1923    4 Sheets-Sheet 1
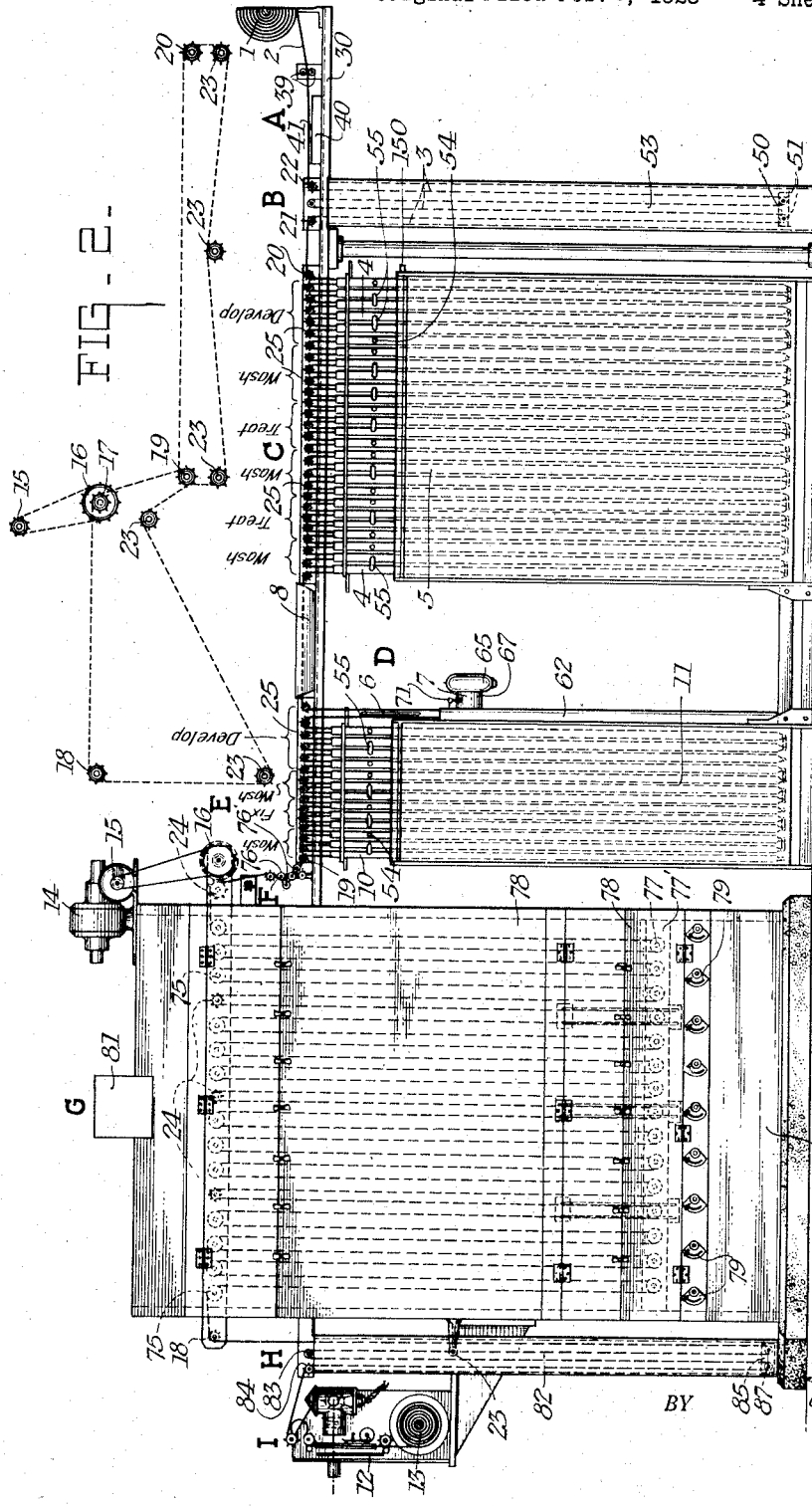
INVENTOR.
John G. Capstaff,
R. L. Stinchfield
BY
ATTORNEYS.

Nov. 6, 1928.
J. G. CAPSTAFF
1,690,616
FILM TREATING APPARATUS
Original Filed Feb. 3, 1923    4 Sheets-Sheet 2
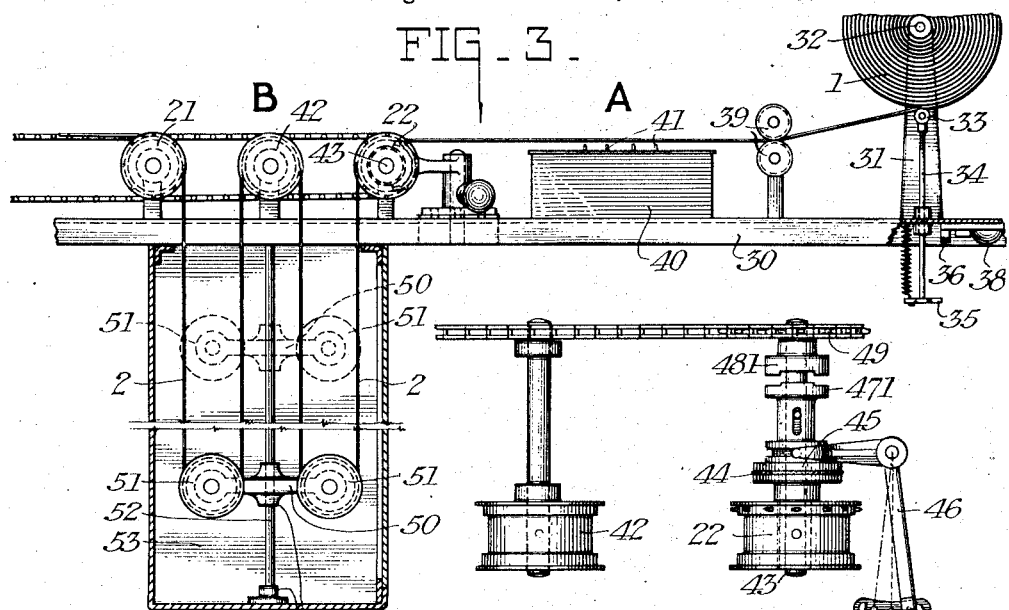
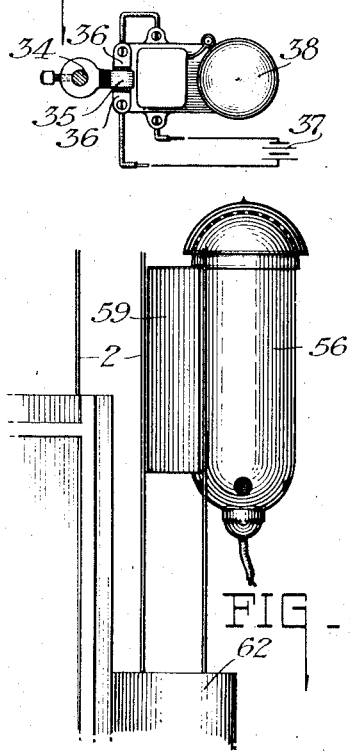
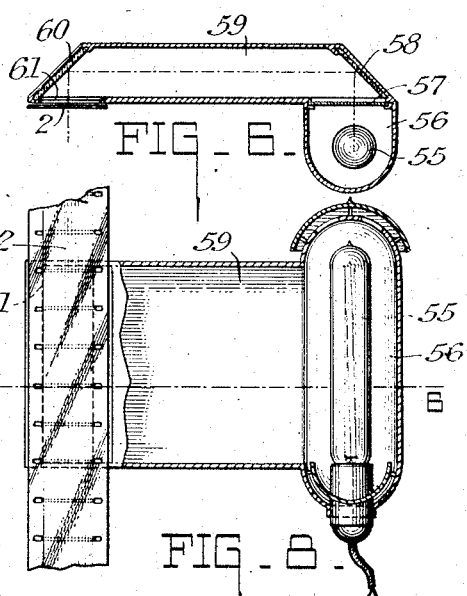
INVENTOR.
John G. Capstaff,
BY
ATTORNEYS.

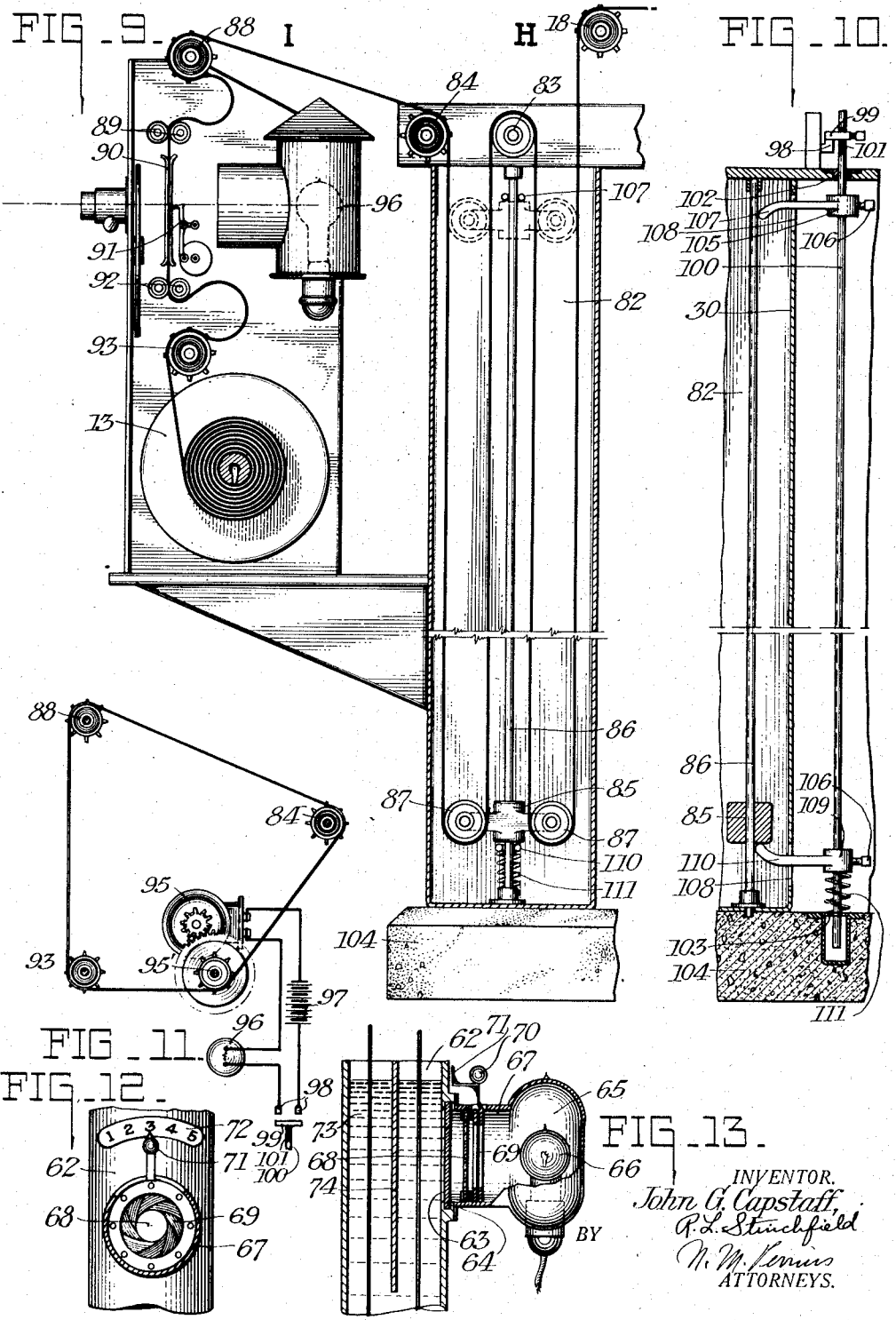

Nov. 6, 1928.
J. G. CAPSTAFF
1,690,616
FILM TREATING APPARATUS
Original Filed Feb. 3, 1923    4 Sheets-Sheet 4
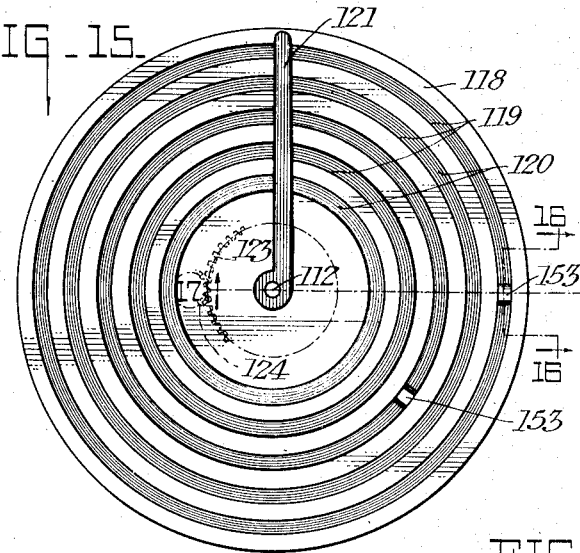
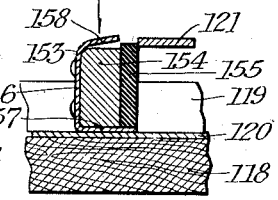
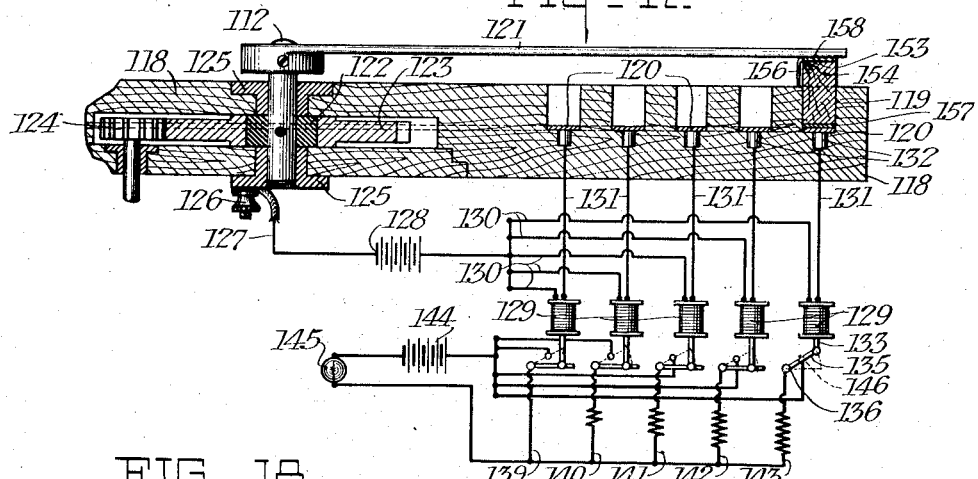
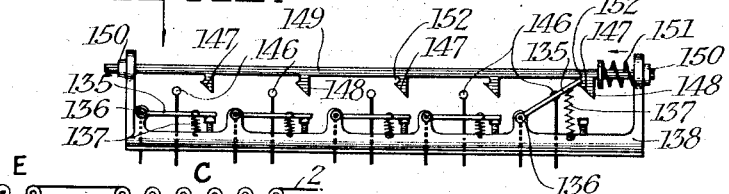
INVENTOR.
John G. Capstaff,
BY
ATTORNEYS.

Patented Nov. 6, 1928.

1,690,616

UNITED STATES PATENT OFFICE.

JOHN G. CAPSTAFF, OF ROCHESTER, NEW YORK, ASSIGNOR TO EASTMAN KODAK COMPANY, OF ROCHESTER, NEW YORK, A CORPORATION OF NEW YORK.

FILM-TREATING APPARATUS.

Application filed February 3, 1923, Serial No. 616,846. Renewed December 2, 1927.

This invention relates to apparatus for the treatment of photographic material and particularly for the carrying on, as a continuous process applied to motion picture film, of the process disclosed in my Patent No. 1,460,703, granted July 3, 1923. As pointed out in that application, the film is exposed in a camera, the latent image developed into a silver image, the silver image removed, the film cleared of residual salts, thereby being rendered sensative, the image examined, the film subjected to a controlled printing light and redeveloped and fixed.

The present invention has then among its objects the carrying out of this process for commercial purposes, the treatment of large quantities of film with apparatus that is so simple that it can be cared for by a single workman, and the provision of individual treatment for different sections of film according to its needs and dependent on variations of the original exposure, while the treatment as a whole is maintained uniform. Other objects will appear hereinafter. The attainment of these objects introduces problems which have been overcome in the apparatus herein disclosed and which will now be described, reference being made to the accompanying drawings in which the same reference characters are used throughout to designate the same parts and in which Fig. 1 is an assembly side elevation of the entire apparatus;

Fig. 2 is a diagram of the driving system;

Fig. 3 is a detailed view partly in section of the film supply mechanism;

Fig. 4 is a detail plan of the control of one of the feed sprockets;

Fig 5 is a diagram of an electric alarm control circuit;

Fig. 6 is a horizontal section of the illuminating system at the observation station;

Fig. 7 is an elevation of the same;

Fig. 8 is a vertical section of the same;

Fig. 9 is a detailed view partly in section of the final film inspection equipment;

Fig. 10 is a detail of the control thereof;

Fig. 11 is a diagram of the drive for the inspection projector and its control;

Fig. 12 shows the diaphragm control for the printing lamp box;

Fig. 13 is a view principally in section of the printing station;

Fig. 14 is a diagram of another arrangement for inspecting and printing the film;

Fig. 15 is a plan of the control disk:

Fig. 16 is a section on line 16—16 of Fig. 15;

Fig. 17 is a section on line 17—17 of Fig. 15, showing also a diagram of the electric circuits for light controlling magnets;

Fig. 18 shows in detail the latch for the magnet armatures.

In Fig. 1 of the drawing there is shown in assembly the entire apparatus and I will first outline the functions of the various parts, referring to the steps of the process as described in the above mentioned specifications and then describe in greater detail the several parts shown more fully in the other figures.

A roll of film that has been exposed is shown at 1. From this the film 2 extends past a splicing station A, where the lead end of one roll is attached to the tail end of the preceding roll to make a continuous strip. The film then forms a number of loops 3 in the reserve supply station B, from which it is led to a series of treatment tanks at C. This comprises a series of tubes or tanks 4 in a container 5. The total number of these tubes may, of course, vary and the number utilized for each step of the process may be varied as found desirable in practice. The film passes in a series of loops through these tubes, where it undergoes the first part of the process as outlined in the above mentioned specification. As shown in the drawing, six tubes are used for the first development (step 2 of the described process), five tubes for washing (step 3), four tubes for the reversing bath (step 4), four tubes for washing (step 5), four tubes for the clearing bath (step 6), and three tubes for washing (step 7). The film then passes through a tray of water 8 to an observation and printing station D, comprising an illuminated observation window 6, where a skilled observer views the bleached image and judges its printing value (step 8), and a printing window and lamp at 7, the amount of light being under the control of the operator, the exposure (step 11) being timed in accordance with the printing value determined at the observation window.

It may be here noted that step 9 of the complete process with its accompanying rinse may be omitted. This step, an alkali bath, was introduced for the purpose of preventing re-reversal when a tendency toward this was noted, and, as was pointed out, this was most liable to happen when the steps of the process were not accurately or uniformly carried out. With the present apparatus all of the steps are so carefully regulated that this tendency does not ordinarily appear, though, as pointed out, an alkali bath may be made a standard step.

After being exposed to a controlled printing light, the film passes through a tube of water to a second set of treatment tubes 10 at E, in a container 11. As shown, the first four tubes are used for developing (step 12), the next three for washing (step 13), the next three for fixing (step 14), and the last three for washing (step 15), after which the film passes through a series of squeegee rollers F to the drying cabinet G and thence to a reserve supply chamber H and to an inspecting station I, comprising a projector 12 and a wind-up reel 13.

A motor 14 drives the sprockets that feed the film throughout the apparatus. The details of this drive are immaterial, but the arrangement is indicated diagrammatically in Fig. 2. As indicated, it is of the chain and sprocket type. The pulley sprocket 15 drives sprocket 16 which is coaxial with sprocket 17, the latter communicating motion to sprocket 18, the main drive sprocket for the drying cabinet and 19 the main drive sprocket for the treatment apparatus, the latter communicating motion to sprocket 20, the feed-in sprocket for the treatment apparatus. From sprocket 20 motion is communicated, as will be pointed out later, to sprockets 21 and 22 of the reserve supply chamber. The sprockets 23 are idlers to maintain the tension. Motion is communicated from sprocket 18 to other sprockets 24 in the drying cabinet and from 19 and 20 to the sprockets for the upper rollers 25 of the two series of tanks, the details of the driving connection being quite immaterial, as long as all these driving sprockets advance at uniform and equal speed.

Upon the main frame 30 (see Fig. 3) is mounted a standard 31 carrying a shaft 32, upon which a roll of exposed film may be placed. A roller 33 carried by a spring pressed arm 34 bears against the film. At the lower end of the arm 34 is a contact 35 which in its uppermost position bridges the space between two contacts 36 and closes a circuit through a battery 37 and a bell 38, warning the operator that the film roll is nearly exhausted. Near the support 30 are idle guide rolls 39 and beyond these a table 40 carrying lugs 41. These are used for splicing film. Beyond this is the reserve supply station B having a plurality of film-engaging rollers or sprockets at its top and a plurality carried by a weighted frame 50. As here shown, there are three at the top. Of these, one, indicated as 21, is driven at a constant uniform speed. The second 42 is idle and turns freely. The third 22 is rigid with its shaft 43 and carries a friction surface 44 against which a movable member 45 slidably keyed to the shaft is adapted to bear with a corresponding brake or friction surface. At its other end member 45 carries a clutch element 471 adapted to engage the clutch element 481 of the driven pulley 49, which turns freely on the shaft 43. The member 45 is moved by a pivoted elbow lever 46 which may be set in three positions: 47, at which it causes member 45 to act as a brake stopping sprocket 22; 48, at which it is in an intermediate position, permitting 22 to turn idly; and 49, at which the clutch elements engage and sprocket 22 is turned at a uniform speed the same as 21. As shown, the weighted frame 50 carries two idle rollers 51 and is mounted to slide on guide rod 52 in the chamber 53. Normally the protuberance 53' on frame 50 contacts the projection 54 at the bottom of the chamber and the film 2 passes in loops through the chamber and is fed at a uniform rate by the sprockets 21 and 22. When the signal bell 38 sounds, the operator throws lever 46 to position 47, stopping sprocket 22. The sprocket 21 continues to turn and the film gradually lifts the frame. The feeding rate and the size of the chamber are so related that an ample reserve for all ordinary contingencies is provided. While the sprocket 22 is still, the operator splices the tail end of the film to the lead end of a new roll which is placed on the supply shaft 32, the apertures in the opposing ends of film being held in proper registration by the lugs 41 during this operation. It may be here noted that when the machine is not in use a long leader strip is threaded through it and the lead end of the first roll is spliced to this and drawn through the machine; and when the last roll is finished the leader strip is attached thereto and again drawn through the machine, where it is left.

The film 2 is threaded from sprocket 21 to sprocket 20 and thence through the treatment tubes or tanks 4 at C. Each of these tubes 4 has an outlet or inlet tube 54 at the top and bottom. By joining adjacent tubes at the top and bottom alternately by short lengths of tube 55, the tubes in a group used for the same treatment may be so connected as to permit circulation of the liquid therethrough. The washing tubes are permitted to overflow into the jacket or container 5, which also has its overflow 150 at the top so that the temperature of all the tanks is maintained constant. The film passes through the tubes in loops in which are suspended weighted idle rollers, not shown, as is usual. All of the upper sprockets 25 are driven at uniform speed. The film passes over the operator's station D, being kept moist by the water in tray 8, and then down past the operator's station. The operator judges the printing value of the film at the inspection window 6. As described in the above mentioned specification, the silver image has been removed, but there is a discernible positive image of unremoved silver bromide. The illuminating system for the viewing window is shown in Figs. 6, 7 and 8. A lamp 55 with an extended filament is supported in a lamp box 56 at one side of the film. The opening of the lamp box is covered by a light filter 57, permitting only non-actinic rays to pass. These are reflected by an inclined mirror 58 in the supporting housing 59 to a second inclined mirror 60 behind the film, whence they are reflected through a window 61 in the housing 59 upon the film 2. The operator judges the printing value of the film by inspection by approximately parallel rays, the ability to judge being acquired by experience under the standard conditions afforded by the apparatus.

The film then passes down into a tube 62 containing water 73 near the top of which is the printing station. The water serves merely to keep the film wet. The printing station is shown in Figs. 12 and 13. The tube 62 has in its wall an opening 63 with a glass window 64 which may be transparent or translucent and the lamp housing 65 is supported against this. The housing 65 contains a lamp 66 and has an extension 67 supported against the border of the window. In this extension is a light diffusing screen 68 and an iris diaphragm 69 of familiar construction operated by a handle 70 with a marker 71 adapted to be moved opposite a scale 72. This is moved by the operator in accordance with his judgment of the printing value of the film as a new scene comes to the printing window. The tube 62 has a partition 74 behind which the return reach of the loop of film passes to prevent its accidental further exposure.

From the tube 62 the film passes to the treatment series of tanks E, which are identical in structure and operation with the series at C, and need no further description. Thence the film passes through the squeegee F which preferably comprises rubber or felt rolls 76 pressed by wipers 76', the film passing between the rolls and wipers.

It is then drawn into the drying cabinet G, where it passes in loops over a series of driven sprockets 24 and idle rolls 75 located at the upper part of the cabinet and a series of idle rollers 77 carried by a weighted frame 77'. The cabinet is equipped with doors 78, giving access to the interior and has dampers controlled by handles 79 for controlling the passage of air to the drying chamber proper from an air pressure box 80 at the bottom, the air being drawn out through a duct 81.

The film passes from the drying cabinet G over driven sprocket 18 to the film reserve supply station H. This comprises chamber 82 having at the top a series of film guides, here shown as an idle roller 83 and a feed sprocket 84, and a weighted frame 85 slidable on a guide rod 86 and carrying idle rollers 87. From sprocket 84 the film is fed to sprocket 88, through guide rollers 89, through a projection gate 90 with an intermittent feed indicated at 91 to guide rollers 92, feeding sprocket 93 to the take-up reel 13. A motor 95, indicated on the diagram in Fig. 11, drives the sprockets 84, 88, and 93 and the drive 95' for the intermittent feed and take-up roll. This motor is in series with the projection lamp 96, a source of power 97 and contacts 98 adapted to be bridged by contact 99. This contact 99 insulated at 101 is carried by a vertical rod 100 slidable in apertured plates 102 and 103 in the main frame 30 and in the base 104, and carries two bushings 105 and 109 adapted to be secured by set screws 106 in the desired positions. These bushings having fingers 107 and 110 extending through apertures 108 in the wall of chamber 82 into the path of the weighted frame 85. When the weighted frame moves downwardly, it contacts the lower fingers 110 and moves contact 99 against contacts 98, and when it moves up it contacts the upper fingers 107 and opens the circuit.

The rate at which the film is fed through the treatment and drying apparatus is considerably slower than the speed necessary for proper projection. The sprocket 18 moves continuously at this slow speed and feeds film constantly into the chamber 82. The sprockets 84, 88, 93 and the motion picture mechanism are driven at a speed necessary for projection. If the circuit is open and sprocket 84 stationary, the film (see Fig. 9) will accumulate in the supply chamber as the loops increase until the weighted frame engages the lower fingers 110 and closes the circuit of the motor 95 and advances the film through the projector and winds it up. This more rapid feed gradually exhausts the supply of film in the chamber and raises the weighted frame 85 until it engages fingers 107 and opens the circuit. The light spring 111 merely tends to counterbalance the weight of the rod. This with the slight friction in the plates 102 and 103 maintains the rod in either position.

An alternative arrangement for inspecting the film and controlling the printing light is shown in Figs. 14 to 18. As indicated diagrammatically in Fig. 14, the film 2 passes in loops through the developing and treatment station C, past a printing station 115 to a second developing and treatment station E. The determination of the printing value of the film (step 8 in the above mentioned specification) instead of taking place after bleaching and clearing takes place during the early stages of the first development. The time of first appearance of the image in development is a function of the exposure and, if other factors are the same, may be relied on with a considerable degree of confidence, as indicating the ultimate density of the silver images when working, as is here the case, by the "time and temperature" methods under standardized conditions. Since with the present apparatus the film moves at a uniform rate through the tubes, this first appearance may be measured, not directly in terms of time, but by the distance traveled by the film. For this purpose the film is inspected along that portion of its path where under standardized conditions of development the image first appears if it were subject to exposures in the useful latitude of the material. Such a window 116 is indicated in the diagrammatic showing of Fig. 14, and it has scale markings 117 dividing it into areas here shown as five in number. The film must be viewed by inactinic light which may be thrown on it by a series of illuminators of the type shown in Figs. 6 to 8.

Adjacent the viewing window is a disk 118 of wood or other non-conducting material having a series of concentric grooves 119, here shown as five in number, at the bottom of which are annular metal strips 120. A metal hand 121 is carried by a metal shaft 112 at the center of the disk and rigid with this but insulated therefrom by the material 122 is a gear wheel 123 driven by pinion 124 at constant speed in timed relation with the film advancing sprockets. The shaft 112 turns in bushings 125, one of which carries a binding post 126 connected by wire 127 to one terminal of battery 128, the other terminal of which is connected by wires 130 to one terminal of each of magnets 129, here shown as five in number and arranged in parallel, the other terminals of the magnets being connected by wires 131 to projections 132 on the metal strips 120. Each magnet has a core 133 connected to a switch 135 pivoted at 136 to a frame 138 and retracted by a spring 137. These switches are in parallel branches 139, 140, 141, 142, and 143 of a circuit including a battery 144 and the lamp 145 at the printing station 115. As indicated, the resistance of the branches is different, so that when the circuit is closed through the lamp its brightness will depend on the branch which is closed. When a magnet 120 is energized, it will turn the corresponding switch 135 to its contact point 146 and closing the circuit through its branch. As the switch arm swings it will contact an inclined face 147 on one of a series of latching projections 148 on the rod 149 mounted at 150 to slide on frame 138 and move the rod longitudinally against the spring 151 until the end of the arm catches in the latch space 152 when the spring 151 forces the arm back. The circuit will then remain closed through the actuated switch 135, even though the circuit through the magnet is open, until another magnet is energized when it will move another switch 135 and move the latch rod 149 releasing the first switch 135 which will be at once retracted by its spring 137 and the second switch 135 will be latched.

The operator is supplied with a number of plugs 153 adapted to fit in the grooves 119. Each plug comprises a block 154 having along one face a strip of insulation 155 extending slightly above the upper surface of the block. A strip of metal 156 is secured to the opposite face of the block and its lower end 157 is bent against the bottom while the end 158 extends upward at an inclination over the block. The hand 121 moves at such a rate that if a plug is placed in a groove just in back of the band with the insulation 155 in contact with it, the hand will move around the disk and contact the spring metal end 158 in just the time that is required for the film to pass from the point M at the bottom of the observation window 116 to the point N at the printing window.

The operator having noted at which of the areas of the window 116 the image of a new scene becomes visible, inserts a plug with its insulation against the rear of the hand 121, as the beginning of the scene reaches point M, the plug being inserted in that groove which corresponds to the observed area, and closes a circuit through that resistance which causes the lamp to give the necessary illumination. Of course, the correspondence of these various factors is a matter of experiment with the particular machine, and care must be taken at all times to note and correct any deviation of any factor or part from standard conditions. But when the parts are thus correlated, the hand 121 will close the circuit through the selected magnet as the corresponding scene reaches the printing window. The magnet will close the self-latching switch which will maintain the circuit through the chosen resistance. The hand 121 will be raised somewhat by the inclined spring 158 and pass over the top of the insulation 155. The operator having inserted a plug at the beginning of a scene continues to watch the window and when there is noticeable change in the point at which the image appears, he inserts another plug, which will automatically control the throwing in of another resistance in place of the one previously in circuit.

Further explanation of the operation and functions of the apparatus is unnecessary. It was designed to carry out automatically a new sequence of steps necessary in practicing my new process. Numerous variations in the structure here disclosed are possible and I contemplate as within the scope of my invention all such modifications and equivalents as fall within the scope of the appended claims.

Having thus described my invention, what I claim as new and desire to secure by Letters Patent is:

1. Apparatus for the continuous treatment of strip film by a reversal process and comprising a series of development and treatment tanks wherein a latent image on such film may be developed and the resulting image treated, a printing station and controllable illuminating means at said station, and a second series of development and treatment tanks wherein a latent image formed at such station may be developed and the resulting image treated, and means for driving a single long strip of film continuously through said first series of tanks, then past said station and then through said second series of tanks.

2. Apparatus for the continuous treatment of strip film by a reversal process and comprising a series of development and treatment tanks wherein a latent image on such film may be developed and the resulting image treated, a printing window and controllable illuminating means at said window, and a second series of development and treatment tanks wherein a latent image formed at such window may be developed and the resulting image treated, and means for driving a single long strip of film continuously through said first series of tanks, then past said window and then through said second series of tanks, and an observation window along the path of said film before it reaches the printing window and whereat the image on the film resulting from the first development may be observed and judged.

3. Apparatus for the continuous treatment of strip film by a reversal process and comprising a series of fluid containing tanks wherein a latent image on such film may be developed and the resulting image treated, a printing station, and a second series of fluid containing tanks wherein a latent image formed at said station may be developed, and means for driving a single long strip of film continuously through said first series of tanks, then past said station and then through said second series of tanks, said printing station comprising a fluid containing receptacle and controllable illuminating means for illuminating a film as it passes through said receptacle.

4. Apparatus for the continuous treatment of strip film by a reversal process and comprising a series of fluid containing tanks wherein a latent image on such film may be developed and the resulting image treated, a printing station, and a second series of fluid containing tanks wherein a latent image formed at said station may be developed, and means for driving a single long strip of film continuously through said first series of tanks, then past said station and then through said second series of tanks, and an observation station along the path of the film before it reaches the printing station.

5. Apparatus for the continuous treatment of strip film by a reversal process and comprising a series of fluid containing tanks wherein a laten image on such film may be developed and the resulting image treated, a printing station, and a second series of fluid containing tanks wherein a latent image formed at said station may be developed, and means for driving a single long strip of film continuously through said first series of tanks, then past said station and then through said second series of tanks, and an observation station along the path of the film before it reaches the printing station, said observation station being positioned between the two series of tanks.

6. Apparatus for the continuous treatment of strip film by a reversal process and comprising a series of fluid containing tanks wherein a latent image on such film may be developed and the resulting image treated, a printing station, and a second series of fluid containing tanks wherein a latent image formed at said station may be developed, and means for driving a single long strip of film continuously through said first series of tanks, then past said station and then through said second series of tanks, said printing station comprising a fluid containing receptacle and controllable illuminating means for illuminating a film as it passes through said receptacle, and means for insuring that the film will remain moist as it passes from one series of tanks to the other.

7. Apparatus for the continuous treatment of strip film by a reversal process and comprising a series of development and treatment tanks wherein a latent image on such film may be developed and the resulting image treated, a printing window and controllable illuminating means at said window, and a second series of development and treatment tanks wherein a latent image formed at such window may be developed and the resulting image treated, and means for driving a single long strip of film continuously through said first series of tanks, then past said window and then through said second series of tanks, and an observation window along the path of said film before it reaches the printing window and whereat the image on the film resulting from the first development may be observed and judged, and means for illuminating the film at said observation window by inactinic light.

8. Apparatus for the continuous treatment of strip film by a reversal process and comprising a series of development and treatment tanks wherein a latent image on such film may be developed and the resulting image treated, an observation window and means for illuminating the film thereat by inactinic light whereby the nature of the image may be noted, a printing window, means for throwing actinic light on the film at said window, means for varying the intensity of said actinic light, and a second series of development and treatment tanks, and means for feeding film continuously in a long single strip through said first series of tanks past said observation window and said printing window and through said second series of tanks.

9. Apparatus for the continuous treatment of strip film and comprising a container, a series of tanks therein, means for moving a long strip of film through said tanks successively, whereby it may be subjected to a series of photographic baths and also to washing water, means for supplying running water to certain of said tanks wherein film may be washed and said tanks having outlet means permitting water to overflow into the container, and overflow means at the top of the container, whereby the overflow water in the container will equalize the temperature of all the tanks.

10. Apparatus for the continuous treatment of strip film and comprising a container, a series of tanks within the container, means for moving a long strip of film continuously through said tanks successively, certain of the tanks being adapted to contain chemicals for affecting the photographic images and being so connected as to permit circulation of the film through said tanks, certain other of the tanks being connected to permit the flowing of water therethrough and having outlet means permitting water to flow therefrom into the container, and overflow means at the top of the container, whereby the overflow water in the container will equalize the temperature of all the tanks.

11. Apparatus for the continuous treatment of strip film by a reversal process and comprising a series of treatment tanks wherein an image may be formed in such film, a printing station and controllable illuminating means at said station, a second series of treatment tanks, wherein a latent image formed at such station may be treated, and means for driving a single long strip of film continuously through said first series of tanks, then past said station, and then through said second series of tanks, there being in the path of the film between said series of tanks a station at which the printing value of the images on the film may be determined.

Signed at Rochester, New York this 31st day of January, 1923.

JOHN G. CAPSTAFF